United States Patent
Shah et al.

(10) Patent No.: US 11,954,630 B2
(45) Date of Patent: Apr. 9, 2024

(54) REAL TIME METHOD AND SYSTEM FOR ANALYZING DATA STREAMS

(71) Applicant: Tata Consultancy Services Limited, Mumbai (IN)

(72) Inventors: Viral Prakash Shah, Thane West (IN); Swarup Chatterjee, Kolkata (IN); Sharmila Baksi, Kolkata (IN); Tanmaya Tewari, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 200 days.

(21) Appl. No.: 17/664,696

(22) Filed: May 24, 2022

(65) Prior Publication Data
US 2023/0122597 A1    Apr. 20, 2023

(30) Foreign Application Priority Data

Oct. 18, 2021   (IN) .............................. 202121047290

(51) Int. Cl.
    G06Q 10/0637    (2023.01)
    G06F 16/23      (2019.01)
    G06F 16/2455    (2019.01)

(52) U.S. Cl.
    CPC ..... *G06Q 10/0637* (2013.01); *G06F 16/2308* (2019.01); *G06F 16/24565* (2019.01); *G06F 16/24568* (2019.01)

(58) Field of Classification Search
None
See application file for complete search history.

(56) References Cited

U.S. PATENT DOCUMENTS

| 5,765,028 A * | 6/1998 | Gladden ................. G06N 5/025 706/14 |
| 8,762,302 B1 * | 6/2014 | Spivack ................. G06Q 50/01 706/12 |

(Continued)

FOREIGN PATENT DOCUMENTS

| EP | 2416318 A1 * | 2/2012 | ............. G06F 9/454 |
| WO | WO2016/004188 A1 | 1/2016 | |
| WO | WO2020/041872 A1 | 5/2020 | |

OTHER PUBLICATIONS

Amarasinghe et al "A Data Stream Processing Optimization Framework for Edge Computing Applications", Dec. 2018, IEEE 21 International Symposium on Real-Time Distributed Computing; pp. 91-98 (Year: 2018).*

(Continued)

*Primary Examiner* — Romain Jeanty
(74) *Attorney, Agent, or Firm* — FINNEGAN, HENDERSON, FARABOW, GARRETT & DUNNER LLP

(57) ABSTRACT

Data analysis plays a crucial role to get significant information out of the data. A real time system and method for analyzing data streams have been provided. The system can utilize many different types of data formats such as numeric, text, video, audio, image, or combination thereof. The analysis takes place as per the requirement using an analytical engine and an intermediate output is generated. The intermediate output is further processed using a distributed real time business rule processing engine to determine required conditions in the data. The business rules comprise one or more set of meta data. On match of the business rule, the system triggers an alert or propagates the required information to integrating solution for required actions. The system and method are technology and communication protocol agnostic, and designed with highly efficient load (Continued)

balanced technique, thereby facilitating highly concurrent data processing with minimal latency.

15 Claims, 11 Drawing Sheets

(56) References Cited

U.S. PATENT DOCUMENTS 10,146,592 B2  12/2018  Bishop et al.
2018/0316735 A1  11/2018  Yang et al.

OTHER PUBLICATIONS

Kolajo "Big data stream analysis: A systematic literature review", Dec. 2019, Journal of Gig Data, pp. 1-30 (Year: 2019).*

Oyamada "Data Stream Processing with Concurrency Control", Jun. 2013, Applied Computing Review, vol. 13, No. 2, pp. 54-65 (Year: 2013).*

Fatih Gurcan et al., "Real-Time Processing of Big Data Streams: Lifecycle, Tools, Tasks, and Challenges," Conference—2nd International Symposium on Multidisciplinary Studies and Innovative Technologies, Oct. 2018, IEEE, https://www.researchgate.net/publication/329565393_Real-Time_Processing_of_Big_Data_Streams_Lifecycle_Tools_Tasks_and_Challenges/link/5c31b023299bf12be3b1ce69/download.

D. Jayanthi et al, "A Framework for Real-time Streaming Analytics using Machine Learning Approach," Proceedings of National Conference on Communication and Informatics-2016, 2016, Research Gate, https://www.researchgate.net/profile/Mohamed_Mourad_Lafifi/post/How_to_analyze_batch_data_with_real-time_streaming_data_generating_form_sensors/attachment/59d657db79197b80779ae028/AS:536011308113920@1504806462778/download/A+Framework+for+Real-time+Streaming+Analytics+using+Machine+Learning+Approach.pdf.

Haruna Isah et al., "A Survey of Distributed Data Stream Processing Frameworks," IEEE Access, Oct. 2019, vol. 7, pp. 154300-154316, IEEE, https://ieeexplore.ieee.org/stamp/stamp.jsp?arnumber=8864052.

Adeyinka Akanbi et al, "A Distributed Stream Processing Middleware Framework for Real-Time Analysis of Heterogeneous Data on Big Data Platform: Case of Environmental Monitoring," Sensor, Mar. 2020, vol. 20(11), MDPI, Link: https://www.mdpi.com/1424-8220/20/11/3166.

Alvaro Villalba et al., "Multi-tenant Pub/Sub Processing for Real-time Data Streams," Distributed, Parallel, and Cluster Computing, Jul. 2020, Arxiv, Link: https://arxiv.org/pdf/2007.02802.pdf.

Mandeep Kaur Saggi et al, "A survey towards an integration of big data analytics to big insights for value-creation," Distributed, Parallel, and Cluster Computing, Sep. 2018 vol. 54, Issue 5, pp. 758-790, Elsevier, https://daneshyari.com/article/preview/6925952.pdf.

* cited by examiner

REAL TIME METHOD AND SYSTEM FOR ANALYZING DATA STREAMS

PRIORITY CLAIM

This U.S. patent application claims priority under 35 U.S.C. § 119 to: Indian Patent Application No. 202121047290, filed on 18 Oct. 2021. The entire contents of the aforementioned application are incorporated herein by reference.

TECHNICAL FIELD

The disclosure herein generally relates to the field of data analysis, and, more particularly, to a method and system for analyzing a plurality of data streams in real time.

BACKGROUND

In the digitized world, data has become most important aspect for any organization. Further, data analysis plays a crucial role in various fields to get significant information out of the data. There are different kind of data in communication network, like real time data and complex data. The complex data type is nested form of different kind of data, like combination of image, texts, audio, and video.

There are multiple applications that gather information about the communication network and analyze the data as per the demand. However, for efficient use, the information must be provided in a format suitable for analysis according to data streaming and analyzing system. The typical approach for conversion of data to specific or targeted-platform format data using resources to convert the native platform-specific layout into the portable form and can result in less efficient formats that require additional transport resources. Particularly, it becomes more difficult when, there is need of analyzing different kind of data of large volume.

There have been a few solutions primarily which are dealing with real time data analysis, or near real time data analysis. They are having approach to analyze the data in a different way. The responsiveness of the data analysis solutions is lacking with the increase of data types.

SUMMARY

Embodiments of the present disclosure present technological improvements as solutions to one or more of the above-mentioned technical problems recognized by the inventors in conventional systems. For example, in one embodiment, a system for analyzing a plurality of data streams in real time has been provided. The system comprises an input/output interface, one or more hardware processors and a memory. The input/output interface configured to provide the plurality of data streams as an input from one or more sources. The memory is in communication with the one or more hardware processors, wherein the one or more first hardware processors are configured to execute programmed instructions stored in the memory, to: analyze the plurality of data streams to generate an intermediate output, wherein the intermediate output comprises metadata; receive, a request by an integration engine for analyzing one or more data streams out of the plurality of data streams, wherein the integration engine is configured to perform one or more of the following actions depending on the received request: starting data analysis to analyze the data stream, wherein the start analysis receives a list of data streams, a list of analysis to be performed and details of a callback to be invoked for match propagation as input, determining and providing the status of a previously started data analysis session, wherein a list of session ID's are provided as input, and stopping data analysis to stop the data analysis session, wherein the list of session ID's are provided as input; check a load of each analytical engines among a plurality of analytical engines by a workload manager; determine one or more analytical engines out of the plurality of analytical engines, depending on the checked load; assign the request for analyzing to the determined one or more analytical engines, wherein the one or more analytical engines is configured to generate an output data stream at an output processing rate; perform one of a downscale or an upscale the output processing rate of the one or more analytical engines if the output processing rate is more than or less than a predefined value, respectively, to get scaled data stream; determine a set of business rules that are required to be checked in the scaled data stream, wherein the set of business rules is determined based on a comparison performed by the meta data with a predefined set of conditions; and trigger a call back by performing a lookup on the determined set of business rules to intimate the integration engine to analyze the plurality of data streams.

In another aspect, a method for analyzing a plurality of data streams in real time has been provided. Initially, the plurality of data streams is provided as an input from one or more sources. The plurality of data streams is then analyzed to generate an intermediate output, wherein the intermediate output comprises metadata. Further, a request is received by an integration engine for analyzing one or more data streams out of the plurality of data streams, wherein the integration engine is configured to perform one or more of the following actions depending on the received request: starting data analysis to analyze the data stream, wherein the start analysis receives a list of data streams, a list of analysis to be performed and details of a callback to be invoked for match propagation as input, determining and providing the status of a previously started data analysis session, wherein a list of session ID's are provided as input, and stopping data analysis to stop the data analysis session, wherein the list of session ID's are provided as input. In the next step, a load of each analytical engines is checked among a plurality of analytical engines implemented by a workload manager. In the next step, one or more analytical engines are determined out of the plurality of analytical engines, depending on the checked load. In the next step, the request is assigned for analyzing to the determined one or more analytical engines, wherein the one or more analytical engines is configured to generate an output data stream at an output processing rate. Further, one of a downscaling or an upscaling the output processing rate of the one or more analytical engines is performed if the output processing rate is more than or less than a predefined value, respectively, to get scaled data stream. IN the next step, a set of business rules is determined that are required to be checked in the scaled data stream, wherein the set of business rules is determined based on a comparison performed by the meta data with a predefined set of conditions. And finally, a call back is triggered by performing a lookup on the determined set of business rules to intimate the integration engine to analyze the plurality of data streams.

In yet another aspect, one or more non-transitory machine-readable information storage mediums comprising one or more instructions which when executed by one or more hardware processors cause analyzing a plurality of data streams in real time has been provided. Initially, the plurality of data streams is provided as an input from one or more sources. The plurality of data streams is then analyzed to generate an intermediate output, wherein the intermediate output comprises metadata. Further, a request is received by an integration engine for analyzing one or more data streams out of the plurality of data streams, wherein the integration engine is configured to perform one or more of the following actions depending on the received request: starting data analysis to analyze the data stream, wherein the start analysis receives a list of data streams, a list of analysis to be performed and details of a callback to be invoked for match propagation as input, determining and providing the status of a previously started data analysis session, wherein a list of session ID's are provided as input, and stopping data analysis to stop the data analysis session, wherein the list of session ID's are provided as input. In the next step, a load of each analytical engines is checked among a plurality of analytical engines implemented by a workload manager. In the next step, one or more analytical engines are determined out of the plurality of analytical engines, depending on the checked load. In the next step, the request is assigned for analyzing to the determined one or more analytical engines, wherein the one or more analytical engines is configured to generate an output data stream at an output processing rate. Further, one of a downscaling or an upscaling the output processing rate of the one or more analytical engines is performed if the output processing rate is more than or less than a predefined value, respectively, to get scaled data stream. IN the next step, a set of business rules is determined that are required to be checked in the scaled data stream, wherein the set of business rules is determined based on a comparison performed by the meta data with a predefined set of conditions. And finally, a call back is triggered by performing a lookup on the determined set of business rules to intimate the integration engine to analyze the plurality of data streams.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
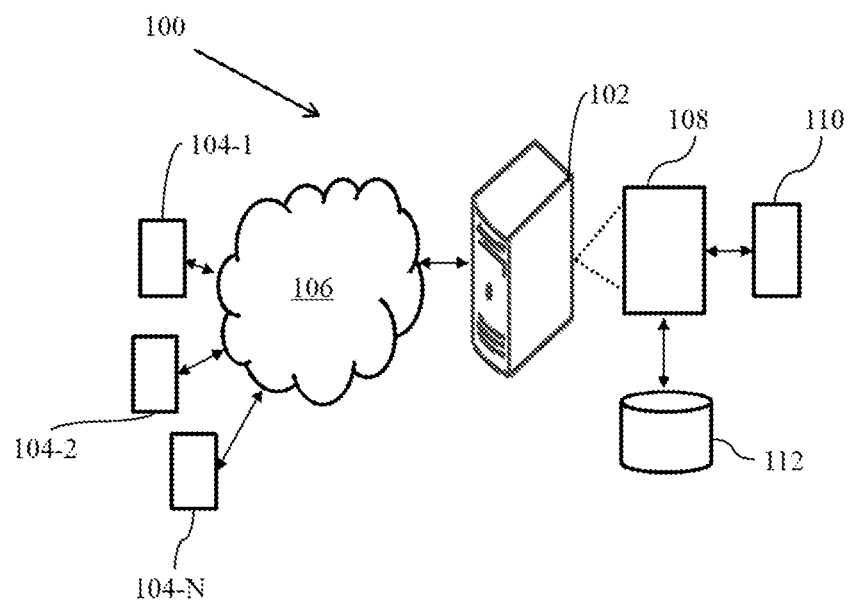
FIG. 1 illustrates a network diagram of a system for analyzing a plurality of data streams in real time according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In the industry today, there are solutions available that are purpose built for a specific type of analysis. These solutions work very efficiently for a small set of inputs or a very specific use case. Most of the solutions can scale for real world problems by creating a balance between the number of parallel analysis or duration/efficiency of the analysis. This trade off or balancing is required as the solutions can only scale by either using specialized hardware or investing in many off the shelf hardware to maintain a high level of confidence as individual analysis is resource intensive. There is a lack of generic, scalable, efficient and easy to use solutions for real time or near real time solutions. The existing systems are not able to analyze complex data types in real time or asynchronous mode. Moreover, the existing solution do not have the ability to handle high volume of concurrent data with scalability.

The present disclosure provides a method and a system for analyzing a plurality of data streams in real time. The system is configured to process high concurrent continuous data load. The further processing of the plurality of data involves a set of analysis which are highly compute intensive but not limited to. These data can be distributed across a multitude of devices for analysis. Individual analysis can be running in a single device or across multiple devices or a set of multiple analysis in the same device or multiple devices. The system applies a type of analytical algorithm on the data and produce an intermediate output. The intermediate output is further processed using a distributed real time business rule processing engine to determine required conditions in the data.

The disclosure further provides built-in flexibility and component division, which makes the system agnostic of communication protocol, inter-process communication methodology and interfacing technologies. For instance, the data can be ingested using the different video streaming protocols like HLS, RTMP, RTSP, etc.

Referring now to the drawings, and more particularly to FIG. 1 through FIG. 10B, where similar reference characters denote corresponding features consistently throughout the figures, there are shown preferred embodiments and these embodiments are described in the context of the following exemplary system and/or method.

Figure 2:
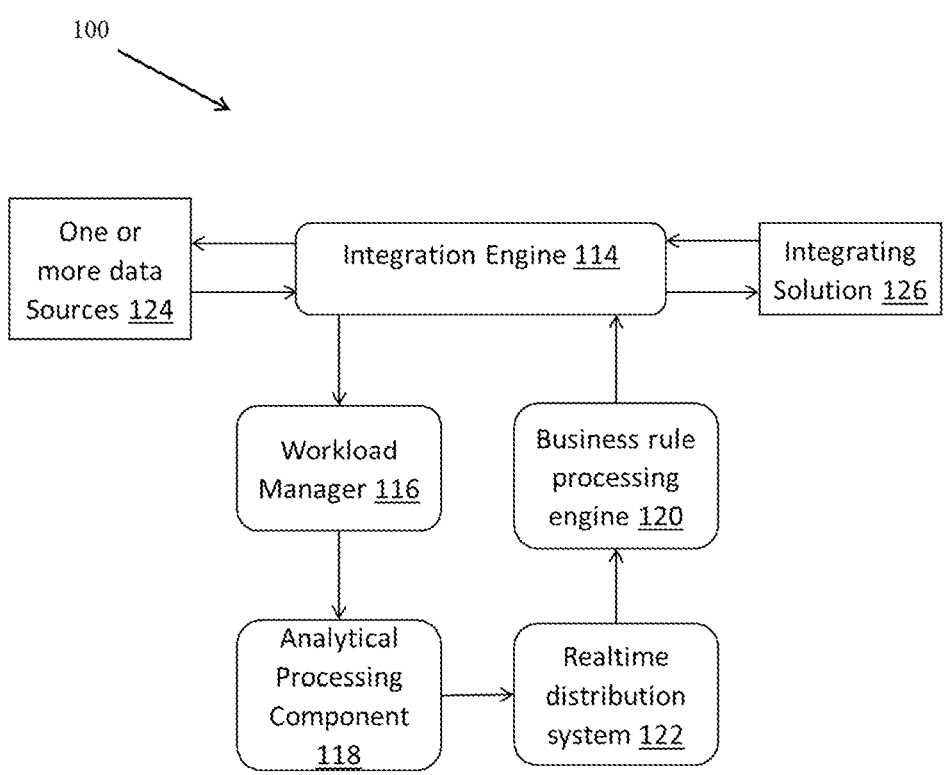
FIG. 2 is a block diagram of the system for analyzing a plurality of data streams in real time according to some embodiments of the present disclosure.
Figure 3:
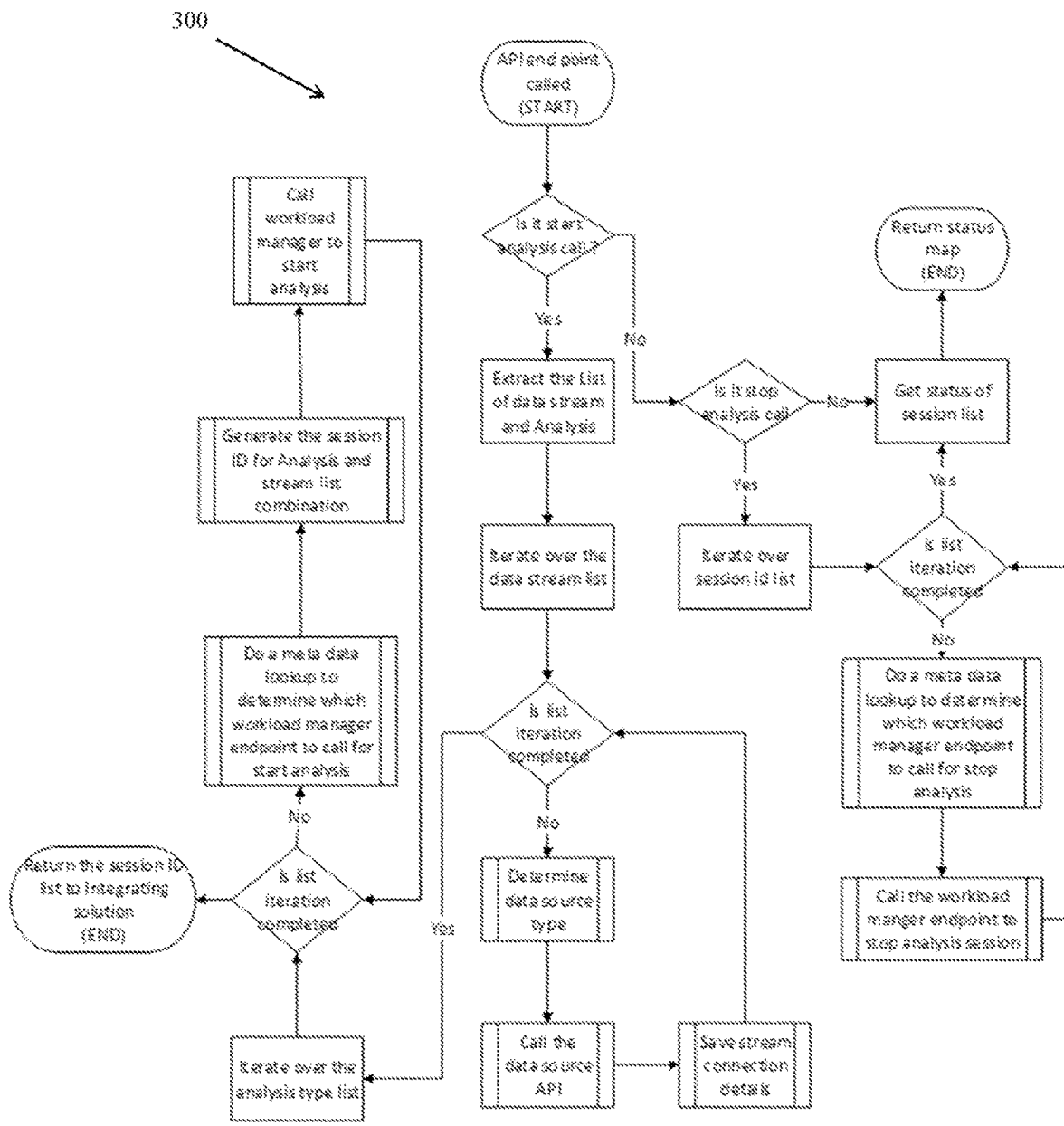
FIG. 3 is a flowchart illustrates working of an integration engine according to some embodiments of the present disclosure.
Figure 4:
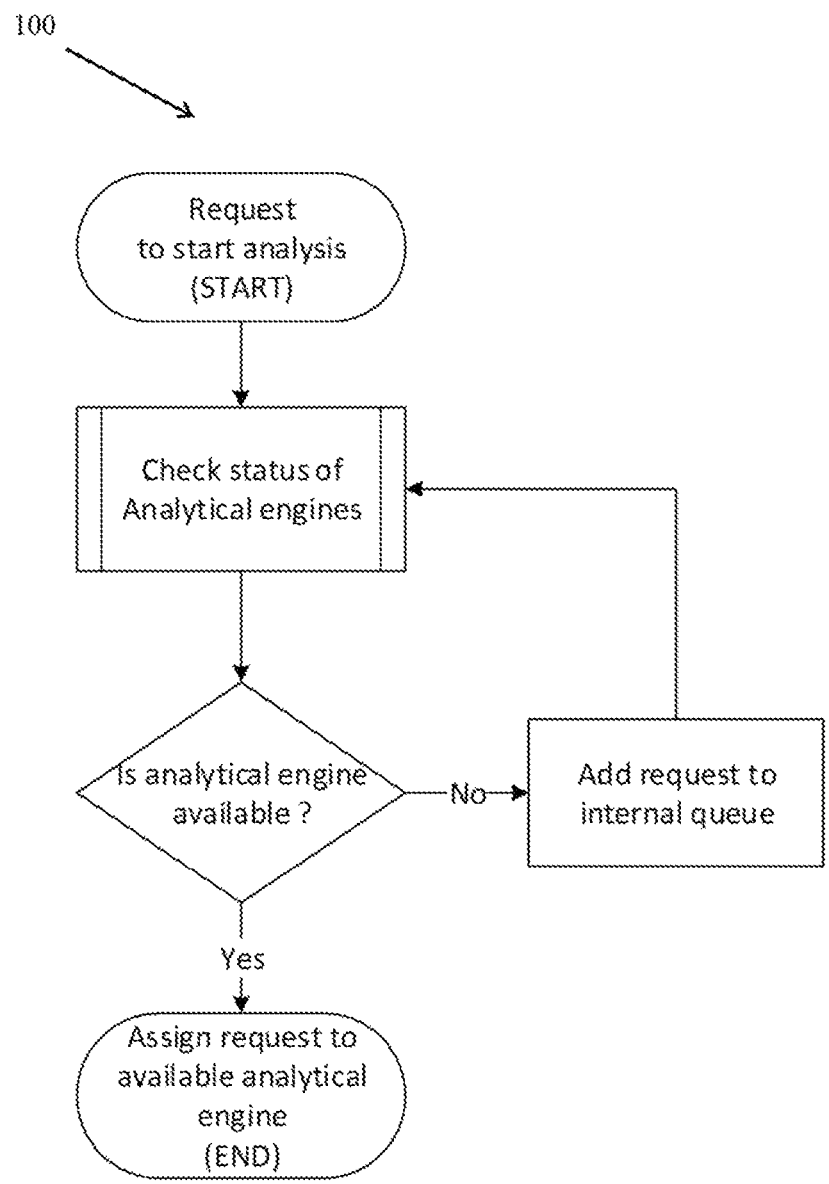
FIG. 4 is a flowchart illustrates working of a workload manager according to some embodiments of the present disclosure.

According to an embodiment of the disclosure, FIG. 1 illustrates a network diagram of a system 100 and FIG. 2 illustrates a block diagram of the system 100 for analyzing a plurality of data streams in real time. The system 100 is configured to consume one of many different types of data stream formats (Numeric/Text/Video/Audio/Image), based on required use cases selection. The system 100 is further configured to apply a type of analytical algorithm on the data and produce an intermediate output. The intermediate output is further processed using a distributed real time business rule processing engine to determine required conditions in the data. These business rules can have one or more set of configurable parameters/meta data. On match of said business rule the system triggers an alert or propagates the required information to integrating solution for required actions. A set of internal or external systems can also subscribe to the outcome of the rule match based on their business requirement or interest. This subscription can be both active or passive in nature. In case of active subscription, the system 100 polls for rule match events or in case of passive subscription it registers a set of application programmable interfaces (APIs') (web or method based) that will be invoked on a rule match event.

It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104, collectively referred to as I/O interface 104 or user interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of units for performing various functions. The plurality of units comprises an integration engine 114, a workload manager 116, a plurality of analytical engines 118 or analytical processing components 118, a business rule processing engine 120, and a real time distribution unit 122 as shown in the block diagram of FIG. 2.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the system 100 is configured to receive the plurality of data streams from one or more data sources 124. It should be appreciated that for the sake of maintaining uniformity in the present disclosure, the terms "the plurality of data streams" or "data" or "plurality of data" or "data streams" are interchangeable. Sometimes, the plurality of data streams contains a lot of irrelevant information, thus the intermediate output is obtained to get the relevant information out of the plurality of data streams. The system 100 is configured to process high concurrent continuous data load primarily of video type data, but not limited to video type. The plurality of data streams can be also be of other data types like numeric, text, audio, images, etc. It can be also a combination of these data types. The plurality of data streams can be both real time or historical, which may come in synchronous and asynchronous mode. The plurality of data streams can be of any combination like real time synchronous, real time asynchronous, historical asynchronous, etc. Further, the incoming data stream can be a recorded stream or a live stream. Each data stream amongst the plurality of data stream might have a different processing need in terms of the analytical engines to be invoked or the nature of compute. The priority for the execution of data streams amongst the plurality of data streams can be decided based on a set of rules defined by a user when amount of available compute is lower than an available concurrency.

According to an embodiment of the disclosure, the system 100 comprises the integration engine 114. The integration engine 114 acts as an interface between the one or more data sources 124 and an integrating solution 126. The integration engine 114 consists of implementation of the application programmable interface (API) endpoints that are invoked by external agents that want to use the system 100. These API's are not restricted to a single technology or connection methodology. In an example, these APIs can be implemented as REST API's, while in another example, they can be Java API's. The working of integration engine 114 is shown in the flowchart 300 of FIG. 3. The integration engine 114 is configured to perform one or more of the following actions depending on the received request:

Start Analysis: This end point is used to accept request to analyze a data stream. It takes the following parameters as input:
List of data streams
List of analysis to be performed
Details of callback to be invoked for match propagation
The API on successful start of an analysis session returns a session ID that can be used for other interactions with the system like getting status of analysis or stopping a running analysis.

Get Status: This end point is used to determine and provide the status of a previously started analysis session. The parameters expected as input are:

List of session ID's

The API returns a map of session ID's and status.

Stop Analysis: This end point is used to stop an analysis session. It is most relevant in cases where the input data stream is expected to be available even after the analysis is no longer required. This end point takes the following input parameters:

List of session ID's

The API on success returns a map of session ID's and status.

All the above API's internally decide their control flow based on meta data lookup at two points. The first point is when it is decided which data source to be connected. The connection and interaction logic for different supported data sources may be encapsulated in their individual methods/procedures. The correct method/procedure to be called is determined based on the input parameter passed to the API and its corresponding meta information. The second point is when the correct analytical engine is queried, there is a lookup of the correct workload manager to which control must be passed. This decision is again based on the meta data which contains the mapping between different analysis type and their corresponding workload manager.

According to an embodiment of the disclosure, the system 100 comprises the workload manager 116. The working of the workload manager 116 is shown in the flowchart 400 of FIG. 4. The workload manager 116 is configured to check a load among the plurality of analytical engines 118 and determine one or more analytical engines required to handle the load, out of the plurality of analytical engines 118, depending on the checked load. The workload manager 116 is further configured to accept and distribute the requests for analysis of the plurality of data streams across the plurality of analytical engines 118. The workload manager 116 is implemented in one iteration as a REST API or as a method API. The workload manager 116 provides the below functions:

Accept requests: This function encapsulates the capability to accept requests and store them in an internal queue implementation.

Check status: This function checks the load among the various analytical engines and determines which of them can be used for the requested analysis.

Assign request: This function is responsible for assigning the analysis request to the determined analytical engine.

According to an embodiment of the disclosure, there can be multiple analytical engine instances defined for each data stream or compound streams. The invocation of one or more analytical engines can be in synchronous or asynchronous or hybrid mode.

Figure 5:
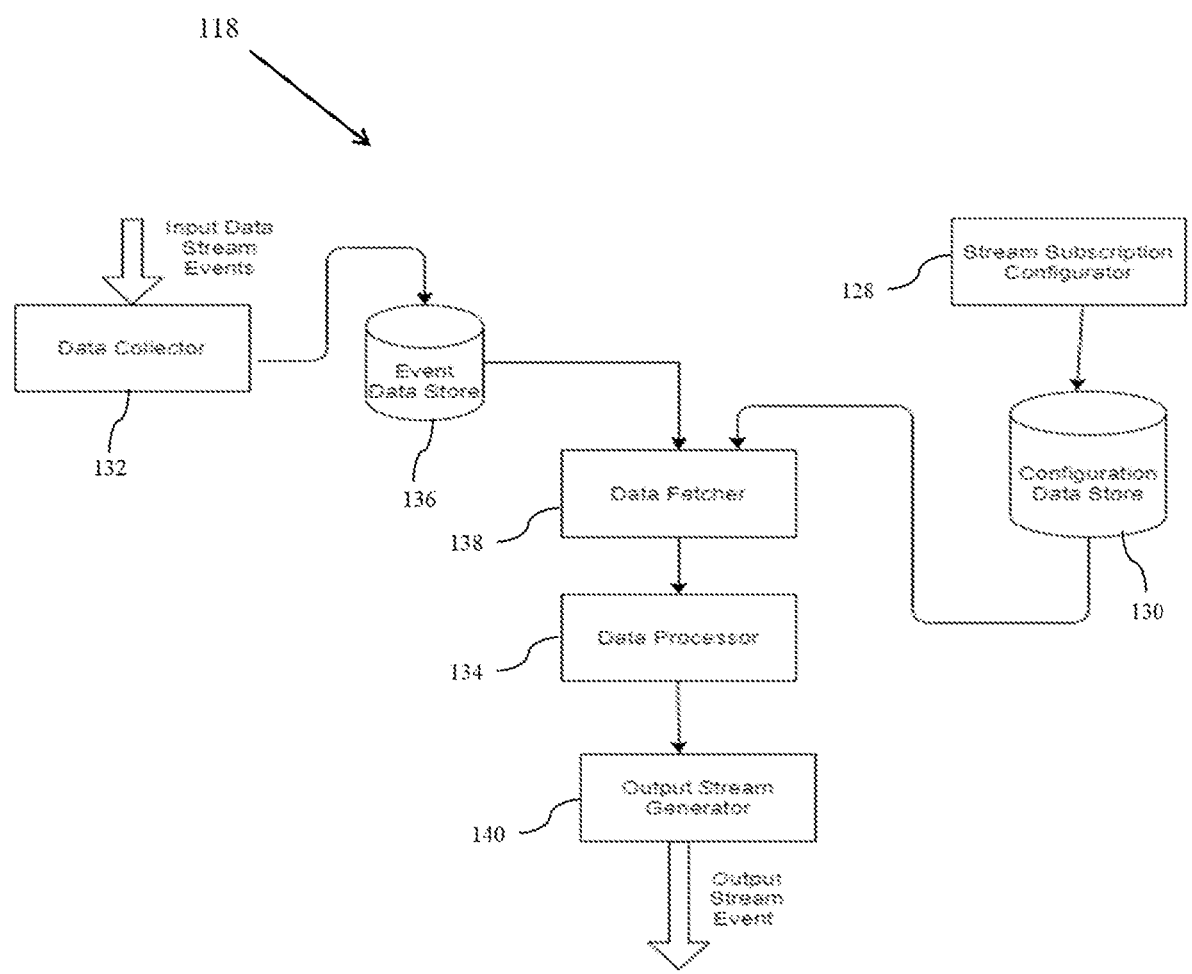
FIG. 5 is a block diagram of the analytical processing components according to some embodiment of the present disclosure.

According to an embodiment of the disclosure, the system 100 further comprise the analytical processing components 118 as shown in the block diagram of FIG. 5. The analytical processing component is configured to parse the plurality of data stream from the one or more data sources. The analytical processing components 118 further comprises a stream subscription configurator 128, a configuration data store 130, a data collector 132, an event data store 136, a data fetcher 138, a data processor 134, and an output stream generator 140.

The active data fetchers read the incoming request from the queued data store and transfer it to the data processor pool in a load balanced fashion. This helps to achieve high concurrency through parallel computing with minimal latency. The pool size is based on configurable parameter and can be adjusted as per the expected volume of the data streams to be processed. The processed data stream event from the data processors, is then be sent back to the subscribed system/application, which can be further converted to alerts/notifications as per business requirements. The various components of the analytical processing components are explained as follows:

Stream subscription configurator 128—The stream subscription configurator 128 is configured to register the configuration data of the data stream subscription into the system 100.

Configuration data store 130—This is a repository to save the configuration data for all the stream subscriptions. This data is used to process the data streams or stream events and forward it to the external entities.

Data collector 132—The data collector 132 is configured to collect the incoming data stream event, preprocess the stream event, convert it from an unstructured to structured format and then push it to the configuration data store 130.

Data Processor 134—The data processor 134 is configured to process the data stream event and forward the output to an output stream generator unit 140.

Event Data Store 136—This is a repository to save the incoming data stream event and make it available for the data processor 134. This is a queue and allows events to be served in a First-In-First-Out basis.

Data fetcher 138—The data fetcher 138 is configured to fetch the saved data stream events from the data store and forward it to the data processor 134 which has been subscribed for the data stream.

Output stream generator unit 140—The output stream generator 140 is configured to convert the output into the desired format for the receiver and forward it to the receiver. It can connect to the correct topic/queue in the real-time distribution system and publish the output in the same The analytical processing components can also be explained with the help of following example:

```
{
sessionID: //This is an id used internally by the system to track
the analytical session
,dataStreamID: //This is used to determine the stream that was
analyzed
,engineID: //This helps to identify which analysis engine has
generated this output
,orgID : //In case of multiple tenanted usage of system we know
for which tenant this output was generated
,payload : //This is specific to the analytical engine, we are
taking an engine for detecting people in a video stream as
example
    {
    time : //Timestamp from stream when output was
generated
        ,peopleCount : //Number of people detected in the
stream
        ,frameHeight : //height of the video frame being
analyzed
        ,frameWidth : //Width of the video frame being
analyzed
        ,peopleInfo: //details of each person detected in the
video frame
        [
        {
        Pid: // Automated ID assigned to the
person detected by the analytical engine
            ,X coordinate: //X coordinate of the
top left of the bounding box covering the
detected person
            ,Y coordinate: //Y coordinate of the
top left of the bounding box covering the
```

```
        detected person
            ,height: //Height of the bounding box
            ,width: //Width of the bounding box
            ,confidence: //Confidence of the
        detection
        }, //End of details of first person
        detected
        {
            Pid: // Automated ID assigned to the
        person detected by the analytical engine
            ,X coordinate: //X coordinate of the
        top left of the bounding box covering the
        detected person
            ,Y coordinate: //Y coordinate of the
        top left of the bounding box covering the
        detected person
            ,height: //Height of the bounding box
            ,width: //Width of the bounding box
            ,confidence: //Confidence of the
        detection
        }
    ] // end of people information array
}//end of payload
}//end of output message
```

Figure 6:
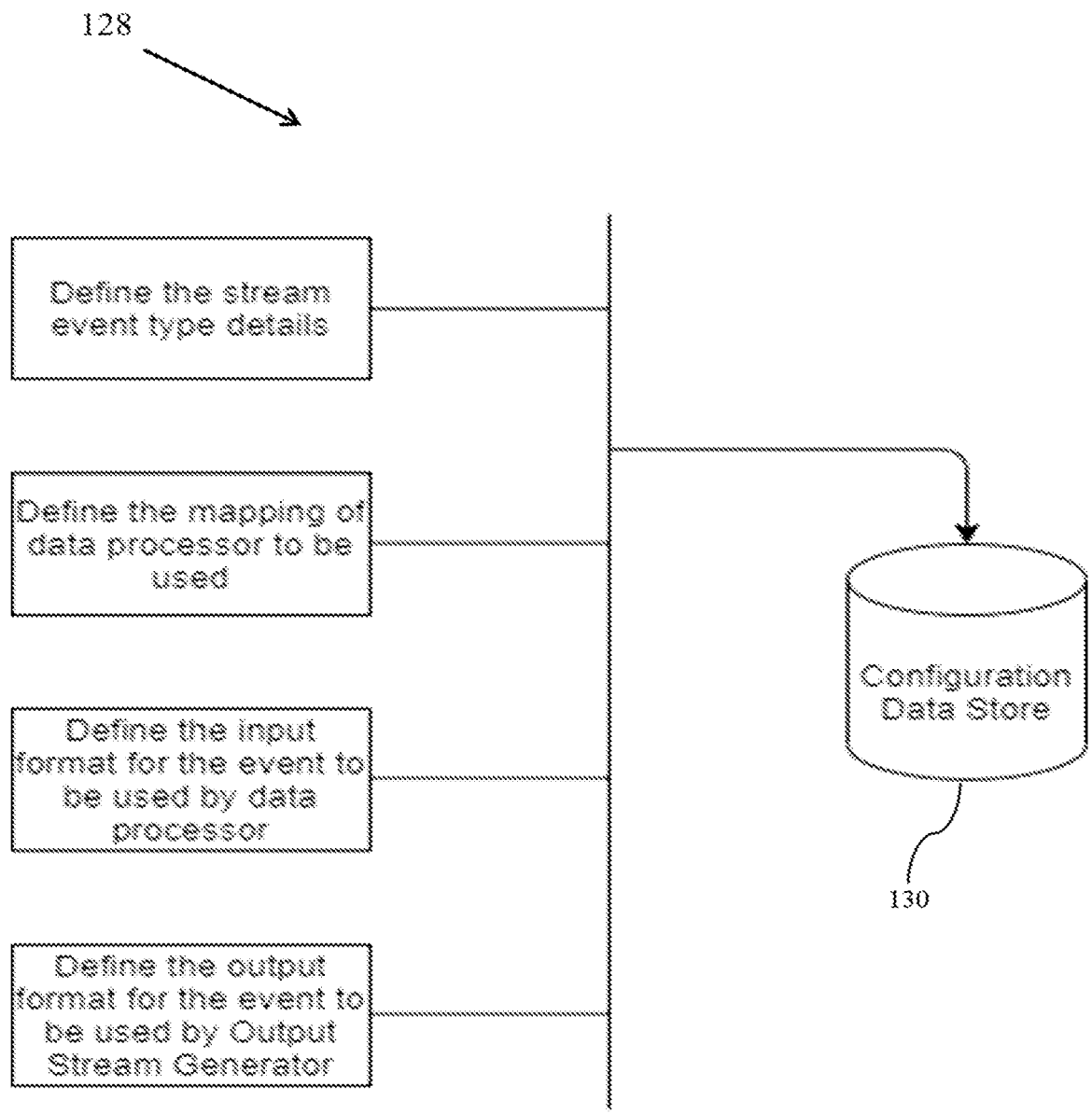
FIG. 6 is a block diagram of a stream subscription configurator according to some embodiment of the present disclosure.

According to an embodiment of the disclosure, a block diagram of the stream subscription configurator 128 is shown in FIG. 6. The stream subscription configurator 128 is configured to configure a plurality of business rules defining the plurality of data streams for which the rule should be applied. The data format is also defined, in which the incoming request should be converted into and forwarded for data processing. The output event format to be defined in which the output should be given to the external entity (application/system). All these are part of configuration data and collected by the stream subscription configurator 128. The data collected by the stream subscription configurator 128 is saved into the configuration data store 130. The processing of the data events might also require some additional configuration inputs which is captured using the stream subscription configurator 128.

Figure 7:
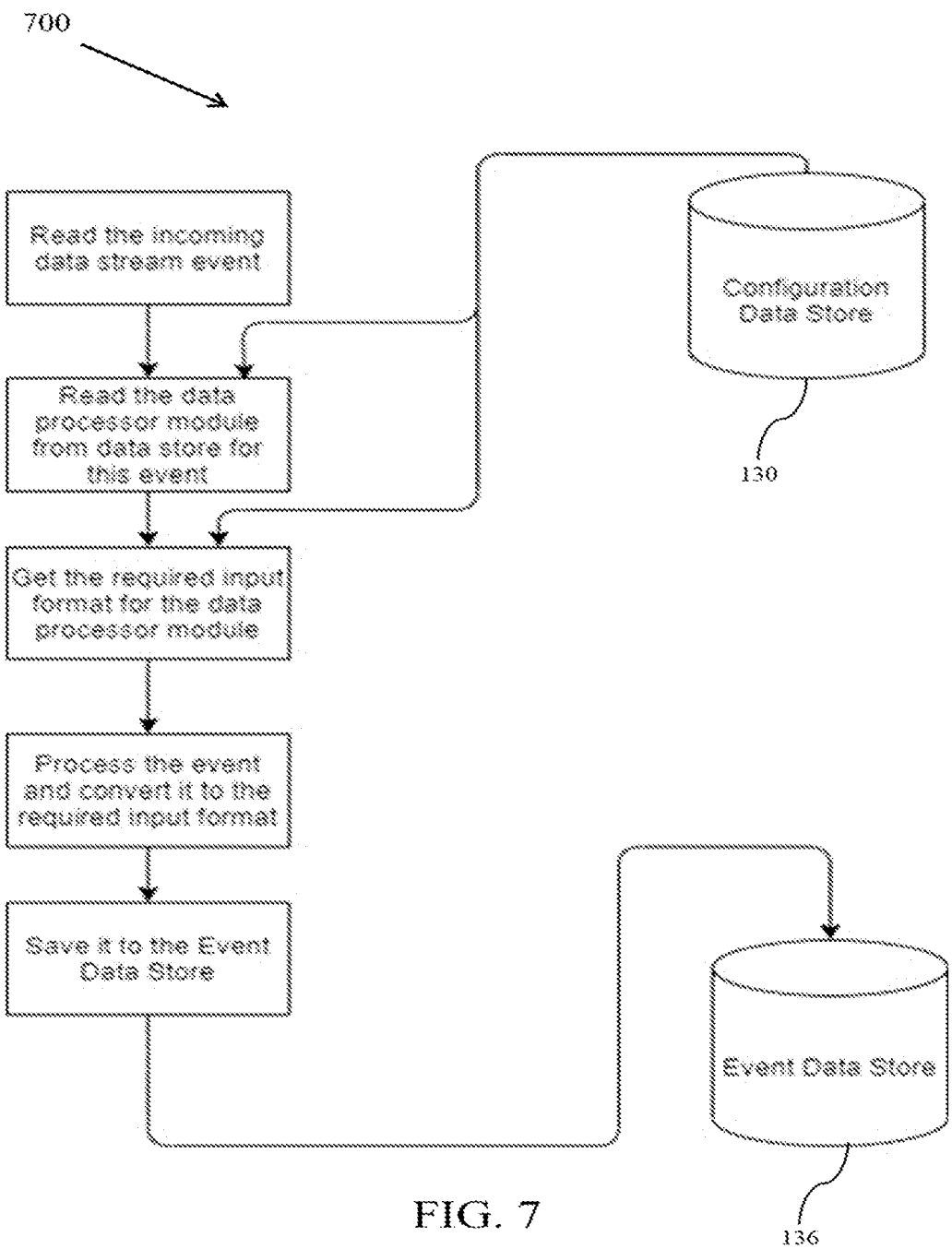
FIG. 7 is a flowchart illustrating the working of a data collector according to some embodiments of the present disclosure.

According to an embodiment of the disclosure, the data collector 132 is configured to receive endpoint for the incoming requests as shown in the flowchart 700 of FIG. 7. The data collector 312 is configured to receive an event E(i) and convert it into E'(i) and save it to the event data store. The event E'(i) has a format which is understandable by the corresponding data processor for the event. A request identifier or token is also generated against the saved event. This request identifier or token is used to keep a track of the status of the data stream event, till its processed output is received. The data collector 132 supports bulk receipt of events into the system and marks each of them by the request identifier or token. Bulk receipt of events allows to make entries to the event data store 136 with minimal amount of connections or network calls. It has a retry mechanism to ensure zero fault-tolerance. The request identifier or token which is generated can never be same for two separate events.

Figure 8:
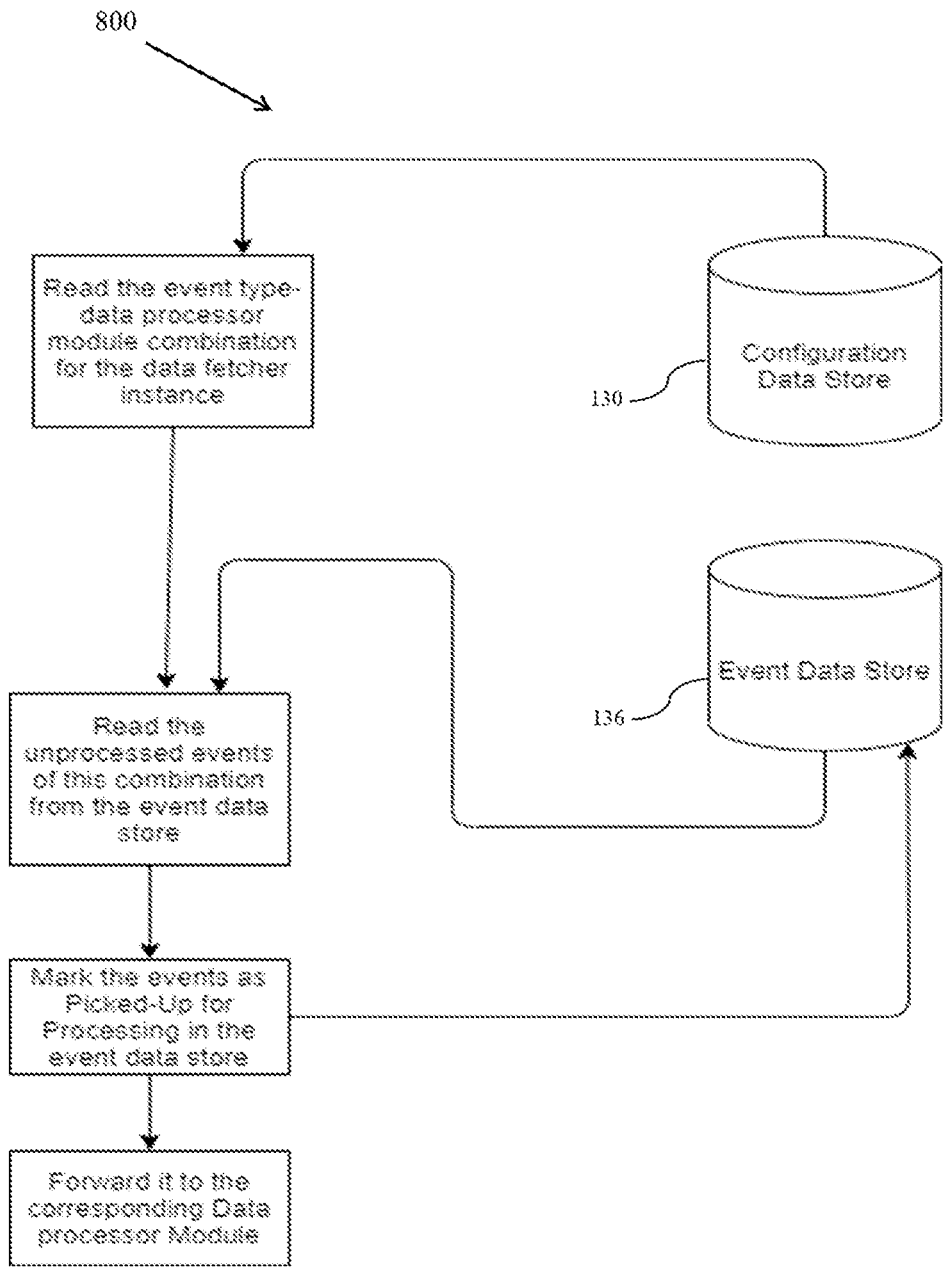
FIG. 8 is a flowchart illustrating the working of a data fetcher according to some embodiments of the present disclosure.

According to an embodiment of the disclosure, each of the instances are tied to a specific event type-data processor combination and can behave as an individual application. The data fetcher 138 instance is configured to fetch only those events from the event data store which are of the corresponding event type-data processor module combination, to which it is tied to. A flowchart 800 illustrating working of the data fetcher 138 is shown in FIG. 8. Events are picked up in bulk from the event data store 136, thereby ensuring highly optimized number of connections to the data store from the data fetcher 138. The data fetcher 138 is configured to forward the picked-up events to the pool of data processors through an efficient load balanced technique, thereby facilitating highly concurrent data processing with minimal latency.

The instance for the data fetcher 138 can also be scheduled to run at predefined time intervals. There can be multiple instances of the data fetcher 138 serving the same event type-data processor module combination. However, only one instance out of the total instances of a particular event type-data processor combination, is active at a time. Other instances are in passive mode. This helps to ensure that no two instances pick up the same event from the event data store for processing.

Figure 9:
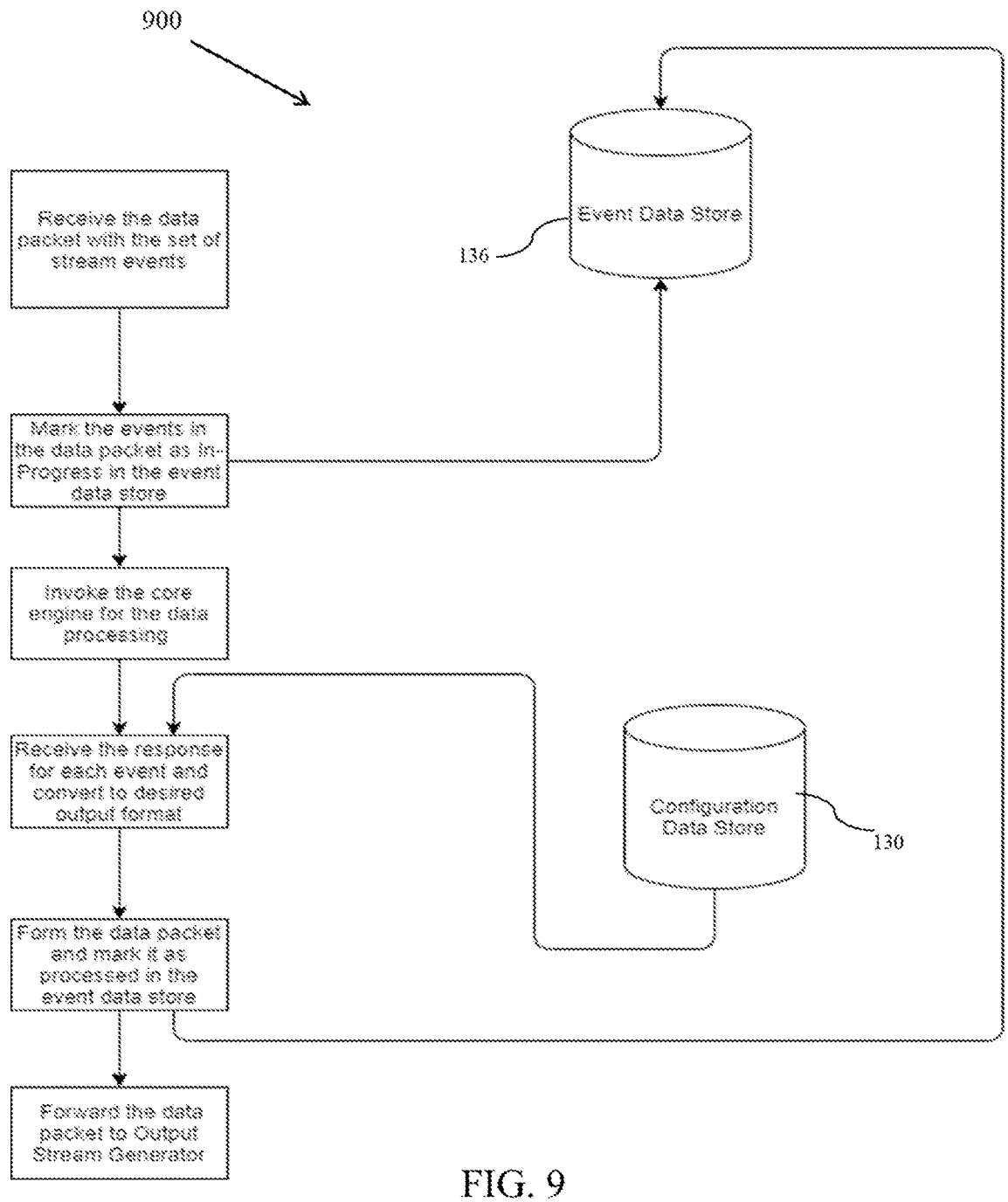
FIG. 9 is a flowchart illustrating the working of a data processor according to some embodiments of the present disclosure.

According to an embodiment of the disclosure, the data processor 134 is configured to support high concurrency as shown in the flowchart 900 of FIG. 9. There are multiple instances of the data processor 134, to support high concurrency. The events are forwarded in bulk as a data packet to the data processor 134. There is an option to set a cap on the maximum number of data packets that can be forwarded to the data processor 134 at a time. This cap depends on the processing speed of the data processor 134. The data processor 134 is pluggable into the system 100 and have any custom implementation as per the requirement.

The data processor 134 is further configured to decompose the data packet into individual events and forward it to the processor queue. This ensures that, at any point of time, the core processor engine is not left underutilized, even if the size for the incoming data packets is not uniform. Not all data packets might have the same number of events packaged into it. The core processor engine reads a chunk of events from the processor queue for processing in parallel. The processor queue size is equal to the maximum allowed data packet size. It then read the configuration data from the configuration data store 130, convert the processed response of core engine to the configured output data format. The converted events are then united to reform the data packet. The data packet is forwarded to the output stream generator 140.

According to an embodiment of the disclosure, the output stream generator 140 is configured to receive data packet from the data processor 134. Callback to the registered REST API or Web Service or direct method of the subscribed system/application is made. This is necessary to notify the entities of the completed event processing. The output stream generator 140 replaces the need for cumbersome scheduler based polling to check the event request status against the generated request identifiers or tokens. Callback mechanism helps to avoid connecting to the event data store 136 to fetch the request status, which is otherwise needed for poll-based mechanism. In case the subscribed system/application wishes to continue with the scheduler based polling mechanism, the system 100 supports the same too. The subscribed system/application can be the integrating solution or a publisher instance for some queue/data store.

According to an embodiment of the disclosure, the system 100 also comprises the real time distribution unit 122. The real time distribution unit 122 is configured to scale down or scale up the output processing rate of the one or more analytical engines if the output processing rate is more than or less than a predefined value, respectively, to get scaled data stream. The output of the one or more analysis engines 118 output rate varies. This variation is based on the type of analysis and the data stream. This necessitates that the present disclosure can both scale up and down in terms of processing of the analysis engine's output. The real time distribution unit 122 caters to this requirement. It provides a simple publish and subscribe mechanism for data distribution and transmission. An existing technology solution is used for this like a messaging queue or an enterprise service bus as the real time distribution unit 122. The chosen solution needs to ensure that the following properties are supported:

Message durability: Messages passed into the system 100 persist and are not lost across restarts or auto cleaned up if not acknowledged.

Message acknowledgment: The real time distribution unit 122 provides a mechanism by which a message consumer can provide an acknowledgement when a message has been processed. Only then marking it as processed.

Only once delivery: This property relates to the capability of ensuring that each message is received and processed by only one consumer from a set of consumers. Thus, ensuring that a message is processed only once.

According to an embodiment of the disclosure, the business rule processing engine 120 is configured to determine, a set of business rules that are required to be checked in the scaled data stream, wherein the set of business rules is determined based on a comparison performed by the meta data with a predefined set of conditions. Further, a call back is triggered by performing a lookup on the determined set of business rules to intimate the integration engine 114 to analyze the plurality of data streams. The business rule processing engine 120 is responsible for processing the intermediate output from the analytical engines 118. The processing involves determining the set of business rules that are required to be checked, check the meta data set for the same and confirm if its conditions are being met. In cases where the conditions are met the engine will do a lookup and trigger the required call back to intimate the integrating solution. To achieve its goal the component's processing can be broken down into the below stages:

Data subscription stage: This stage of the component is responsible for connecting to the real time distribution systems different queue's and polling them for a new output message. When a new message is available this stage consumes the same and makes it available to the next stage.

Message parsing stage: This stage accepts the output message and parses the same. Once the analytical engine id has been extracted the parser is able to do a lookup and determine the parsing implementation to be used specific to this engines output format.

Business rule comparing stage: This stage receives the parsed output message as input and then based on the engine id determines the correct rule comparator implementation to call. The rule comparator implementation in turn may also have meta data that it needs to lookup to continue processing. On match of the business rule conditions being met the next stage is triggered.

Alert generator: Once a business rule conditions have been satisfied based on the analytical engine id, a lookup is performed, and the correct call back is determined that needs to be triggered. The call back implementation is provided the alert details from rule match and the call back is triggered.

Table I shows an example of how to capture the details of the message parser implementation, business rule comparator implementation and callback implementations. These tables are used at run time to determine the correct implementation to trigger and do the required processing:

TABLE I

An example showing capturing the details of the message parser implementation, business rule comparator implementation and callback implementations

| Id | Engine ID | Message parser implementation |
|---|---|---|
| 1 | Video_Eng_1 | Video_eng_1_parser |
| 2 | Image_Eng_1 | Image_eng_1_parser |

| Id | Engine ID | Business rule comparator implementation |
|---|---|---|
| 1 | Video_Eng_1 | Detect people presence |
| 2 | Image_Eng_1 | Count people |

| Id | Engine ID | Call back implementation |
|---|---|---|
| 1 | Video_Eng_1 | REST API for alert propagation |
| 2 | Image_Eng_1 | Java API for alert propagation |

Figure 10A:
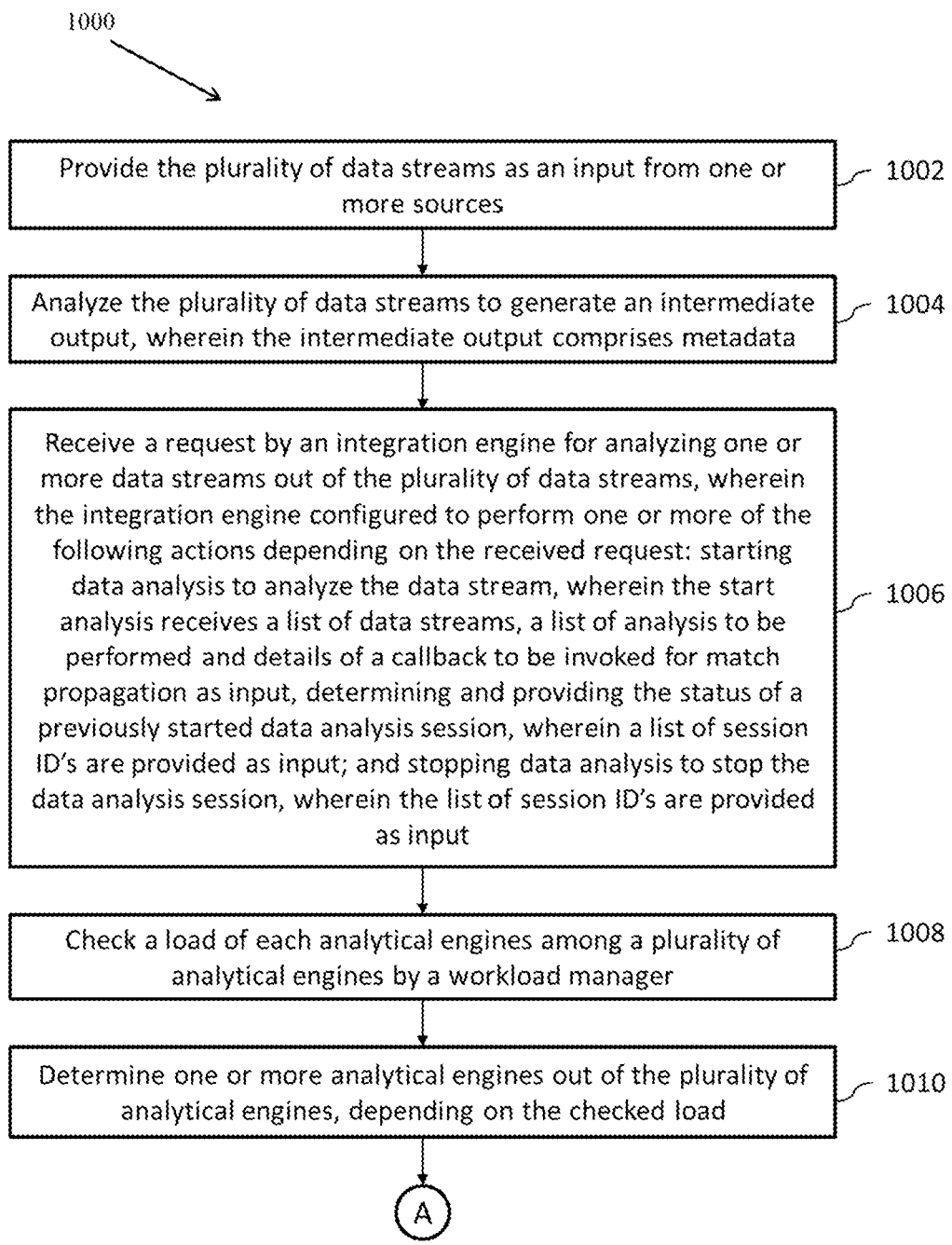
FIGS. 10A and 10B are a flowchart of a method for analyzing a plurality of data streams in real time according to some embodiments of the present disclosure
Figure 10B:
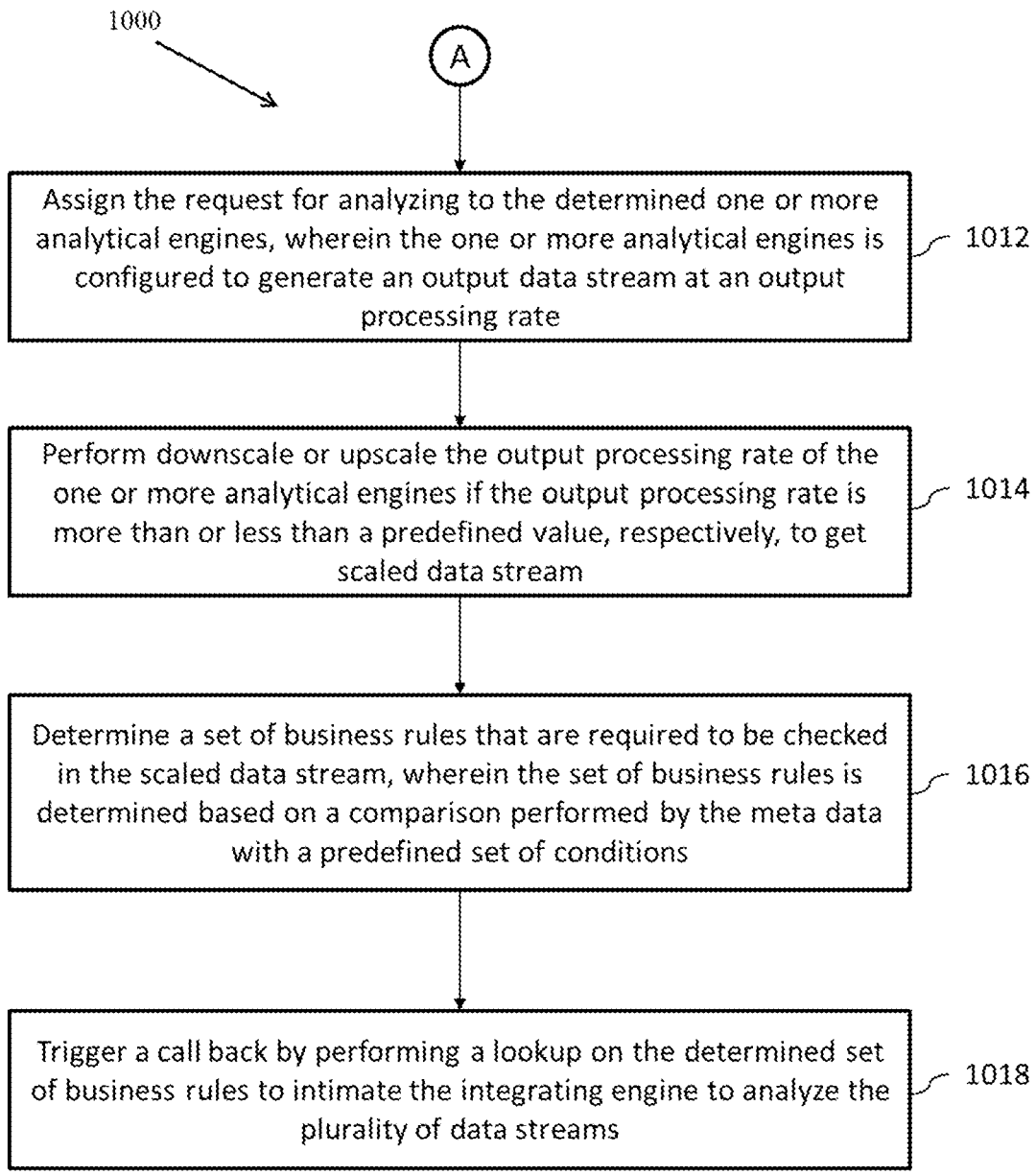

FIG. 10A-10B illustrates an example flow chart of a method 1000 for analyzing a plurality of data streams in real time, in accordance with an example embodiment of the present disclosure. The method 1000 depicted in the flow chart may be executed by a system, for example, the system 100 of FIG. 1. In an example embodiment, the system 100 may be embodied in the computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 1000 are described with help of system 100. However, the operations of the method 1000 can be described and/or practiced by using any other system.

Initially at step 1002 of the method 1000, the plurality of data streams is provided as an input from the one or more data sources 124. At step 1004, the plurality of data streams is analyzed to generate an intermediate output, wherein the intermediate output comprises metadata corresponding to the plurality of data streams. Sometimes, the plurality of data streams contains a lot of irrelevant information, thus the intermediate output is obtained to get the relevant information out of the plurality of data streams.

Further at step 1006 of the method 1000, a request is received by the integration engine 114 for analyzing one or more data streams out of the plurality of data streams. The integration engine 114 is configured to perform one or more of the following actions depending on the received request:

Starting data analysis to analyze the data stream, wherein the start analysis receives a list of data streams, a list of analysis to be performed and details of a callback to be invoked for match propagation as input.

Determining and providing the status of a previously started data analysis session, wherein a list of session ID's are provided as input.

Stopping data analysis to stop the data analysis session, wherein the list of session ID's are provided as input;

Further at step 1008 of the method 1000, the load of each analytical engines among a plurality of analytical engines is checked by the workload manager 116. At step 1010, one or more analytical engines are determined out of the plurality of analytical engines, depending on the checked load by the workload manager 116.

Further at step 1012 of the method 1000, the request is assigned for analyzing to the determined one or more analytical engines, wherein the one or more analytical engines is configured to generate an output data stream at an output processing rate. At step 1014, the output processing rate of the one or more analytical engines is scaled down or up, if the output processing rate is more than or less than a predefined value, respectively, to get scaled data stream.

Further at step 1016 of the method 1000, the set of business rules is determined that are required to be checked in the scaled data stream, wherein the set of business rules is determined based on a comparison performed by the meta data with a predefined set of conditions. And finally, at step 1018, a call back is triggered by performing a lookup on the determined set of business rules to intimate the integration engine to analyze the plurality of data streams.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of data analysis without spending too much time and effort in all kind of data such as synchronous, asynchronous, real time, historic etc. The embodiment thus provides a method and a system for analyzing a plurality of data streams in real time.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for analyzing a plurality of data streams in real time, the method comprising:

providing, via one or more hardware processors, the plurality of data streams as an input from one or more sources;

analyzing, via the one or more hardware processors, the plurality of data streams to generate an intermediate output, wherein the intermediate output comprises metadata;

receiving a request by an integration engine implemented via the one or more hardware processors for analyzing one or more data streams out of the plurality of data streams, wherein the integration engine is configured to perform one or more of the following actions depending on the received request:

starting data analysis to analyze the data stream, wherein the start analysis receives a list of data streams, a list of analysis to be performed and details of a callback to be invoked for match propagation as input, determining and providing the status of a previously started data analysis session, wherein a list of session ID's are provided as input, and stopping data analysis to stop the data analysis session, wherein the list of session ID's are provided as input;

checking, via the one or more hardware processors, a load of each analytical engines among a plurality of analytical engines implemented via the one or more hardware processors, by a workload manager implemented via the one or more hardware processors;

determining, via the one or more hardware processors, one or more analytical engines out of the plurality of analytical engines, depending on the checked load;

assigning, via the one or more hardware processors, the request for analyzing to the determined one or more analytical engines, wherein the one or more analytical engines is configured to generate an output data stream at an output processing rate;

performing, via the one or more hardware processors, one of a downscaling or an upscaling the output processing rate of the one or more analytical engines if the output processing rate is more than or less than a predefined value, respectively, to get scaled data stream;

determining, via the one or more hardware processors, a set of business rules that are required to be checked in the scaled data stream, wherein the set of business rules is determined based on a comparison performed by the meta data with a predefined set of conditions; and triggering, via the one or more hardware processors, a call back by performing a lookup on the determined set of business rules to intimate the integration engine to analyze the plurality of data streams.

2. The method of claim 1 further comprising deciding a priority for the execution of data streams amongst the plurality of data streams based on a set of rules defined by a user when amount of available compute is lower than an available concurrency.

3. The method of claim 1 further comprising subscribing a set of tools to an outcome of the integrating engine.

4. The method of claim 1 wherein the plurality of data streams comprises one or more of video data, numeric, text, audio, or images.

5. The method of claim 1, wherein the scaling is performed using one of a messaging queue technique or an enterprise service bus technique.

6. The method of claim 1, wherein the set of business rules comprises one or more set of configurable parameters, meta data or a customizable piece of logical code block.

7. The method of claim 1, wherein the workload manger configured to perform:

accept request function configured to encapsulate the capability to accept requests and store them in an internal queue implementation, check status function configured to check the load among the plurality of analytical engines and determine which of them can be used for the requested analysis, or assign request function configured to assign the analysis request to the determined analytical engine.

8. A system for analyzing a plurality of data streams in real time, the system comprises:

an input/output interface configured to provide the plurality of data streams as an input from one or more sources;

one or more hardware processors; and a memory in communication with the one or more hardware processors, wherein the one or more first hardware processors are configured to execute programmed instructions stored in the memory, to:

analyze the plurality of data streams to generate an intermediate output, wherein the intermediate output comprises metadata;

receive, a request by an integration engine for analyzing one or more data streams out of the plurality of data streams, wherein the integration engine is configured to perform one or more of the following actions depending on the received request:

starting data analysis to analyze the data stream, wherein the start analysis receives a list of data streams, a list of analysis to be performed and details of a callback to be invoked for match propagation as input, determining and providing the status of a previously started data analysis session, wherein a list of session ID's are provided as input, and stopping data analysis to stop the data analysis session, wherein the list of session ID's are provided as input;

check a load of each analytical engines among a plurality of analytical engines by a workload manager;

determine one or more analytical engines out of the plurality of analytical engines, depending on the checked load;

assign the request for analyzing to the determined one or more analytical engines, wherein the one or more analytical engines is configured to generate an output data stream at an output processing rate;

perform one of a downscale or an upscale the output processing rate of the one or more analytical engines if the output processing rate is more than or less than a predefined value, respectively, to get scaled data stream;

determine a set of business rules that are required to be checked in the scaled data stream, wherein the set of business rules is determined based on a comparison performed by the meta data with a predefined set of conditions; and trigger a call back by performing a lookup on the determined set of business rules to intimate the integration engine to analyze the plurality of data streams.

9. The system of claim 8 further configured to decide a priority for the execution of data streams amongst the plurality of data streams based on a set of rules defined by a user when amount of available compute is lower than an available concurrency.

10. The system of claim 8 further configured to subscribe a set of tools to an outcome of the integrating engine.

11. The system of claim 8 wherein the plurality of data streams comprises one or more of video data, numeric, text, audio, or images.

12. The system of claim 8, wherein the scaling is performed using one of a messaging queue technique or an enterprise service bus technique.

13. The system of claim 8, wherein the set of business rules comprises one or more set of configurable parameters, meta data or a customizable piece of logical code block.

14. The system of claim 8, wherein the workload manger configured to perform:

accept request function configured to encapsulate the capability to accept requests and store them in an internal queue implementation, check status function configured to check the load among the plurality of analytical engines and determine which of them can be used for the requested analysis, or assign request function configured to assign the analysis request to the determined analytical engine.

15. One or more non-transitory machine-readable information storage mediums comprising one or more instructions which when executed by one or more hardware processors cause:

providing, the plurality of data streams as an input from one or more sources;

analyzing, via the one or more hardware processors, the plurality of data streams to generate an intermediate output, wherein the intermediate output comprises metadata;

receiving a request by an integration engine implemented via the one or more hardware processors for analyzing one or more data streams out of the plurality of data streams, wherein the integration engine is configured to perform one or more of the following actions depending on the received request:

starting data analysis to analyze the data stream, wherein the start analysis receives a list of data streams, a list of analysis to be performed and details of a callback to be invoked for match propagation as input, determining and providing the status of a previously started data analysis session, wherein a list of session ID's are provided as input, and stopping data analysis to stop the data analysis session, wherein the list of session ID's are provided as input;

checking, via the one or more hardware processors, a load of each analytical engines among a plurality of analytical engines implemented via the one or more hardware processors, by a workload manager implemented via the one or more hardware processors;

determining, via the one or more hardware processors, one or more analytical engines out of the plurality of analytical engines, depending on the checked load;

assigning, via the one or more hardware processors, the request for analyzing to the determined one or more analytical engines, wherein the one or more analytical engines is configured to generate an output data stream at an output processing rate;

performing, via the one or more hardware processors, one of a downscaling or an upscaling the output processing rate of the one or more analytical engines if the output processing rate is more than or less than a predefined value, respectively, to get scaled data stream;

determining, via the one or more hardware processors, a set of business rules that are required to be checked in the scaled data stream, wherein the set of business rules is determined based on a comparison performed by the meta data with a predefined set of conditions; and triggering, via the one or more hardware processors, a call back by performing a lookup on the determined set of business rules to intimate the integration engine to analyze the plurality of data streams.

* * * * *